(12) United States Patent
Takenaka

(10) Patent No.: US 9,117,396 B2
(45) Date of Patent: Aug. 25, 2015

(54) THREE-DIMENSIONAL IMAGE PLAYBACK METHOD AND THREE-DIMENSIONAL IMAGE PLAYBACK APPARATUS

(75) Inventor: Koichi Takenaka, Tokyo (JP)

(73) Assignees: SONY CORPORATION, Tokyo (JP); SONY COMPUTER ENTERTAINMENT INC., Tokyo (JP)

( * ) Notice: Subject to any disclaimer, the term of this patent is extended or adjusted under 35 U.S.C. 154(b) by 429 days.

(21) Appl. No.: 13/613,143

(22) Filed: Sep. 13, 2012

(65) Prior Publication Data

US 2013/0002838 A1 Jan. 3, 2013

Related U.S. Application Data

(63) Continuation of application No. PCT/JP2010/006432, filed on Nov. 1, 2010.

(30) Foreign Application Priority Data

Apr. 20, 2010 (JP) ................................. 2010-097325

(51) Int. Cl.
| | |
|---|---|
| H04N 7/15 | (2006.01) |
| H04N 13/04 | (2006.01) |
| G09G 3/20 | (2006.01) |
| H04N 13/00 | (2006.01) |
| G09G 3/00 | (2006.01) |

(52) U.S. Cl.
CPC .................. G09G 3/20 (2013.01); G09G 3/003 (2013.01); H04N 13/0029 (2013.01); H04N 13/0033 (2013.01); H04N 13/0438 (2013.01); G09G 2340/0435 (2013.01); H04N 13/0044 (2013.01); H04N 13/0055 (2013.01); H04N 13/0059 (2013.01)

(58) Field of Classification Search
USPC ................................. 348/56, 43, 53, 51; 345/8
See application file for complete search history.

(56) References Cited

U.S. PATENT DOCUMENTS

| 6,906,687 B2 * | 6/2005 | Werner .............................. 345/8 |
| 2005/0117016 A1 * | 6/2005 | Surman ........................... 348/51 |
| 2006/0221001 A1 | 10/2006 | Matono et al. |

(Continued)

FOREIGN PATENT DOCUMENTS

| JP | 2002-271671 | 9/2002 |
| JP | 2003-125318 | 4/2003 |

(Continued)

OTHER PUBLICATIONS

Supplementary European Search Report dated Oct. 8, 2013, from corresponding European Application No. 10850188.3-1904.

(Continued)

*Primary Examiner* — Gims Philippe
(74) *Attorney, Agent, or Firm* — Katten Muchin Rosenman LLP

(57) ABSTRACT

When the video images to be played back are three-dimensional (3D) images each including a first parallax image and a second parallax image obtained when an object in a 3D space is viewed from different viewpoints, a video attribute determining unit determines whether or not the frame rate of the images is within a predetermined frame rate range at which a flicker is likely to occur. When the frame rate of the 3D images is within the predetermined frame rate range, a frame rate converter raises the frame rate of the 3D images until the frame rate exceeds the predetermined frame rate range.

4 Claims, 14 Drawing Sheets

(56) References Cited

U.S. PATENT DOCUMENTS

| | | |
|---|---|---|
| 2007/0195182 A1 | 8/2007 | Ito |
| 2009/0051759 A1* | 2/2009 | Adkins et al. .................. 348/53 |
| 2010/0066816 A1 | 3/2010 | Kane et al. |
| 2010/0079669 A1 | 4/2010 | Hattori et al. |
| 2011/0249091 A1* | 10/2011 | Kishimoto .................... 348/43 |

FOREIGN PATENT DOCUMENTS

| | | |
|---|---|---|
| JP | 2006-79112 | 3/2006 |
| JP | 2006-259624 | 9/2006 |
| JP | 2006-276545 | 10/2006 |
| JP | 2010-74524 | 4/2010 |
| JP | 2010-78987 | 4/2010 |

OTHER PUBLICATIONS

International Search Report dated Feb. 15, 2011, from corresponding International Application No. PCT/JP2010/006432.

International Preliminary Report on Patentability and Written Opinion of the International Searching Authority dated Nov. 6, 2012 from corresponding International Application No. PCT/JP2010/006432.

Notification of Reason(s) for Refusal dated Feb. 8, 2011, from corresponding Japanese Application No. 2010-097325.

* cited by examiner

| FORMAT | RESOLUTION / FRAME RATE | TYPE OF CONTENT (EXAMPLES) |
|---|---|---|
| FRAME PACKING | 1080p@24Hz | MOVIE |
| FRAME PACKING | 720p@60Hz, 720p@50Hz | GAME |
| SIDE-BY-SIDE | 1080p@60Hz, 1080p@50Hz | BROADCAST |
| TOP-AND-BOTTOM | 1080p@24Hz, 720p@60Hz, 720p@50Hz | |

SETTING ITEM NAME: "CONVERSION OF 24 Hz TO 60 Hz IMAGES"

OPTIONS:
— "OUTPUT DIRECTLY AT THE FREQUENCY OF 24 Hz"
— "CONVERT 24 Hz TO 60 Hz SO AS TO BE OUTPUTTED"

EXPLANATION:
SPECIFY WHEHTER VIDEO ELEMENTS OF 24 Hz IS TO BE OUTPUTTED DIRECTLY AS THOSE OF 24 Hz OR IS TO BE OUTPUTTED AFTER THEY ARE CONVERTED TO THOSE OF 60 Hz.

FIG.18

SETTING ITEM NAME: "CONVERSION OF 24 Hz TO 60 Hz IMAGES"

OPTIONS:
— "AUTOMATIC (FOLLOWING EDID OF TV)"
— "OUTPUT DIRECTLY AT THE FREQUENCY OF 24 Hz"
— "CONVERT 24 Hz TO 60 Hz SO AS TO BE OUTPUTTED"

EXPLANATION:
SPECIFY WHEHTER VIDEO ELEMENTS OF 24 Hz IS TO BE OUTPUTTED DIRECTLY AS THOSE OF 24 Hz OR IS TO BE OUTPUTTED AFTER THEY ARE CONVERTED TO THOSE OF 60 Hz.

THREE-DIMENSIONAL IMAGE PLAYBACK METHOD AND THREE-DIMENSIONAL IMAGE PLAYBACK APPARATUS

BACKGROUND OF THE INVENTION

1. Field of the Invention

The present invention relates to a method and an apparatus for playing back three-dimensional (3D) images.

2. Description of the Related Art

With the ongoing sophistication of consumer television of recent years, three-dimensional (3D) television capable of offering stereoscopic vision is gaining in popularity. Unlike the conventional television displaying two-dimensional images, the 3D television displays stereoscopic images that have visual depths.

There is a variety of technologies for displaying stereoscopic images. However, compared with the conventional displaying of two-dimensional images, schemes employed in consumer 3D television can sometimes face the difficulty of raising the frame rate of the images due mainly to the insufficient capacity of a processing circuit. When the frame rate of images is low, a phenomenon called "flicker" of images may occur. And the flicker can cause a sense of discomfort to the viewers.

SUMMARY OF THE INVENTION

The present invention has been made in view of the foregoing circumstances, and a purpose thereof is to provide a technology for reducing flicker that can occur in 3D television.

In order to resolve the above-described problems, one embodiment of the present invention provides a three-dimensional video playback method. In this method, when an image to be played back is a three-dimensional (3D) image including a first parallax image and a second parallax image obtained when an object in a 3D space is viewed from different viewpoints, it is determined whether or not a frame rate of the images is within a predetermined frame rate range of at which a flicker is likely to occur; and when the frame rate of the 3D images is within the predetermined frame rate range, the frame rate of the 3D images is raised until the frame rate thereof exceeds an upper limit of the predetermined frames rate range, and images with the raised frame rate are played back.

Another embodiment of the present invention relates to a three-dimensional video playback apparatus. The apparatus includes: an video attribute determining unit configured to determine whether or not a frame rate of images is within a predetermined frame rate range at which a flicker is likely to occur, when the image to be played back is a three-dimensional (3D) image including a first parallax image and a second parallax image obtained when an object in a 3D space is viewed from different viewpoints; and a frame rate converter configured to raise the frame rate of the 3D images until the frame rate thereof exceeds an upper limit of the predetermined frame rate range, when the frame rate of the 3D images is within the predetermined frame rate range.

Optional combinations of the aforementioned constituting elements, and implementations of the invention in the form of methods, apparatuses, systems, recording media, computer programs, and so forth may also be effective as additional modes of the present invention.

BRIEF DESCRIPTION OF THE DRAWINGS

Embodiments will now be described by way of examples only, with reference to the accompanying drawings which are meant to be exemplary, not limiting, and wherein like elements are numbered alike in several Figures in which:

FIG. 18 is an exemplary display prompting a 3D television to choose whether the frame rate is to be converted or not.

DETAILED DESCRIPTION OF THE INVENTION

The invention will now be described by reference to the preferred embodiments. This does not intend to limit the scope of the present invention, but to exemplify the invention.

[Three-Dimensional (3D) Imaging Using Parallax Images]

Figure 1:
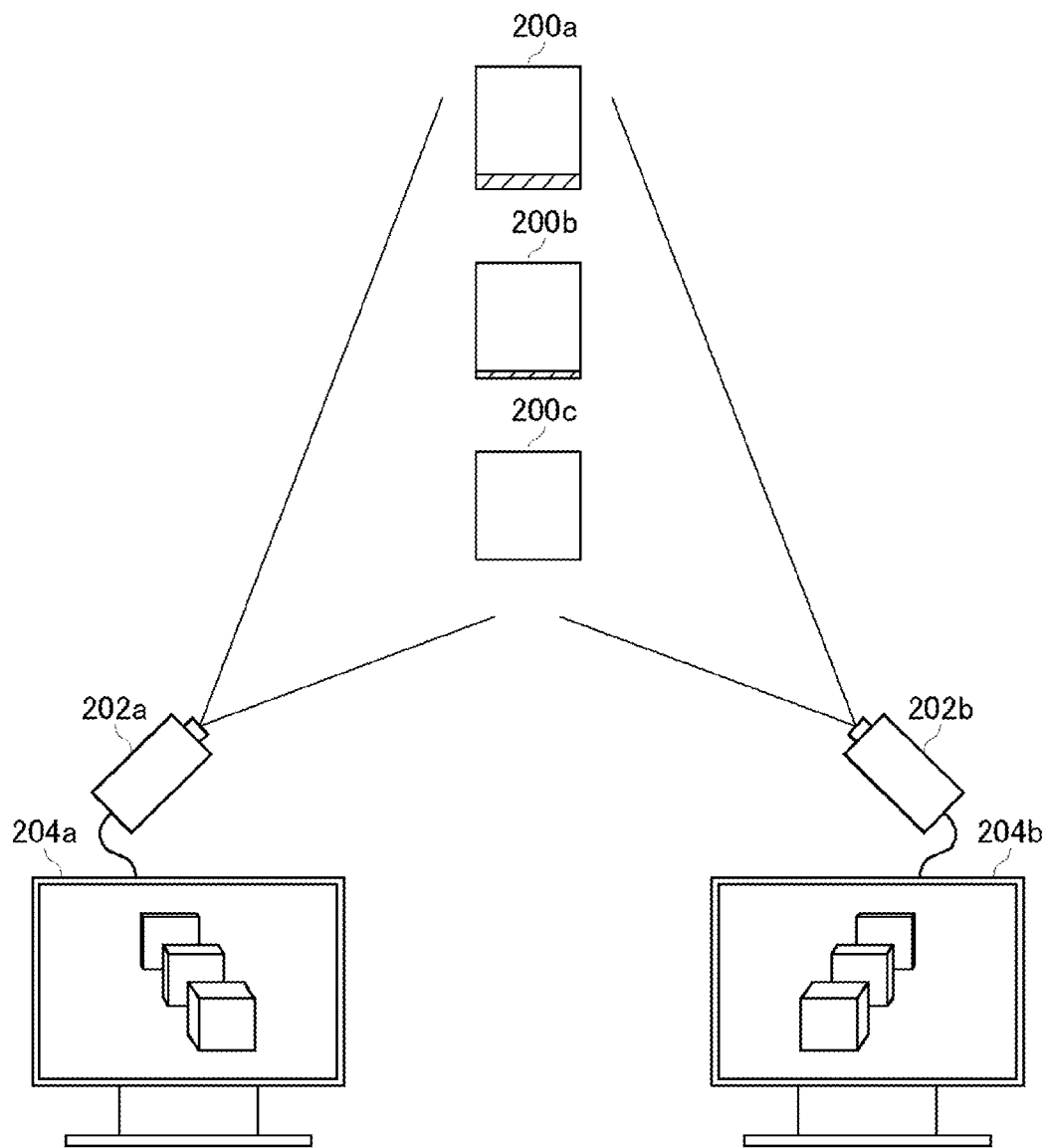
FIG. 1 is an illustration showing a relationship between objects in a three-dimensional (3D) space and their parallax images.

FIG. 1 is an illustration showing a relationship between objects in a three-dimensional (3D) space and their parallax images. In this 3D space, there are three objects, namely, an object 200a, an object 200b, and an object 200c, which are collectively referred to as "object 200" or "objects 200". And the images of the three objects 200 are taken by a left-eye image camera 202a for taking an image from a left side of the objects 200 and a right-eye image camera 202b for taking an image from a right side thereof. These two cameras are collectively referred to as "camera 202" or "cameras 202". In FIG. 1, the image of the objects 200 taken by the left-eye image camera 202a and the image of the objects 200 taken by the right-eye image camera 202b are being respectively displayed on a monitor 204*a* and a monitor 204*b*, which are collectively referred to as "monitor 204" or "monitors 204" for two-dimensional display.

The left-eye image camera 202*a* and the right-eye image camera 202*b* take the images of the objects 200 from different positions such that the images taken by them show the objects 200 in different orientations. The images of the objects 200 as seen from different viewpoints in the 3D space, as in this case, are called "parallax images". Since the left eye and the right eye of a human are about 6 cm set apart from each other, there occurs a parallax (disparity) between the image seen by the left eye and the image seen by the right eye. And it is considered that the human brain recognizes the depth of objects using the parallax images sensed through the left and right eyes. Accordingly, if parallax images sensed through the left eye and the right eye are projected onto the respective eyes, the brain will recognize the parallax images as an image having depths, or a perspective image.

Figure 2:
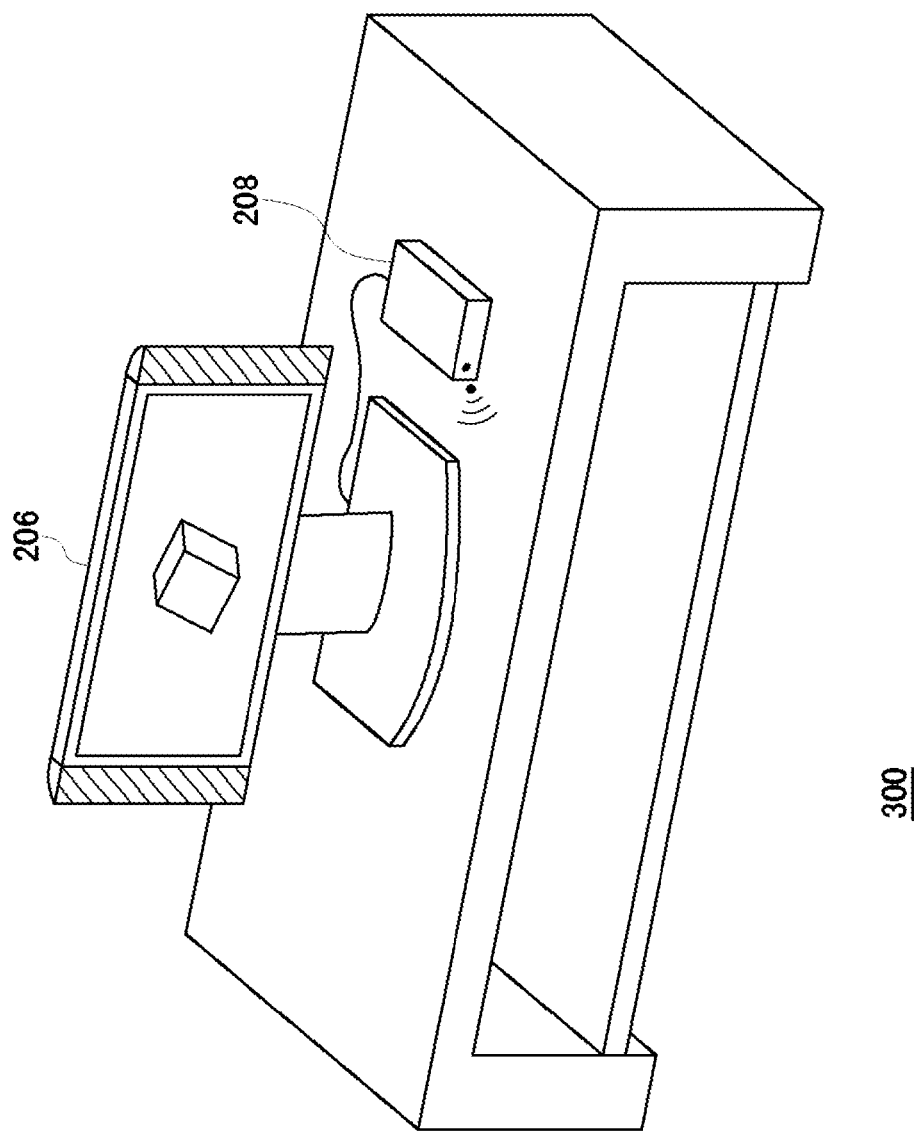
FIG. 2 is an illustration giving an overview of a shutter-type 3D image display system using parallax images.
Figure 2:
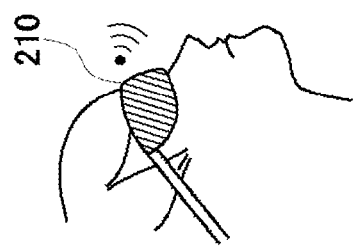

There are a variety of 3D television systems for showing perspective images by use of parallax images to human viewers. However, the present embodiment presents a shutter-type 3D television that displays left-eye parallax images and right-eye parallax images alternately in time division. FIG. 2 is an illustration giving an overview of a shutter-type 3D image display system 300 using parallax images. The 3D image display system 300 includes a 3D television 206 for projecting parallax images, shutter glasses 210 to be used to see the parallax images, and a glasses drive signal transmitter 208 for achieving synchronization between the 3D television 206 and the shutter glasses 210.

The 3D television 206 displays parallax images for the left eye and parallax images for the right eye alternately in time division. The glasses drive signal transmitter 208 transmits the display timing of parallax images on the 3D television 206 as an infrared synchronization signal. The shutter glasses 210, which are provided with a receiving unit (not shown) for receiving the synchronization signal transmitted from the glasses drive signal transmitter 208, operates the shutter on the left lens or the right lens according to the synchronization signal received. The shutter may be implemented by use of known liquid crystal shutter technology, for instance.

More specifically, when the 3D television 206 displays a parallax image for the left eye, the shutter glasses 210 receives a signal requiring the "closing" of the shutter for the right-eye lens from the glasses drive signal transmitter 208. The shutter glasses 210 shields the images entering the right eye by closing the shutter for the right-eye lens based on the signal received. Thus, when the 3D television 206 displays a parallax image for the left eye, the parallax image for the left eye is projected onto the left eye of a user only. On the other hand, when the 3D television 206 displays a parallax image for the right eye, the shutter glasses 210 closes the shutter for the left-eye lens with the result that the parallax image for the right eye is projected onto the right eye of the user only.

Figure 3:
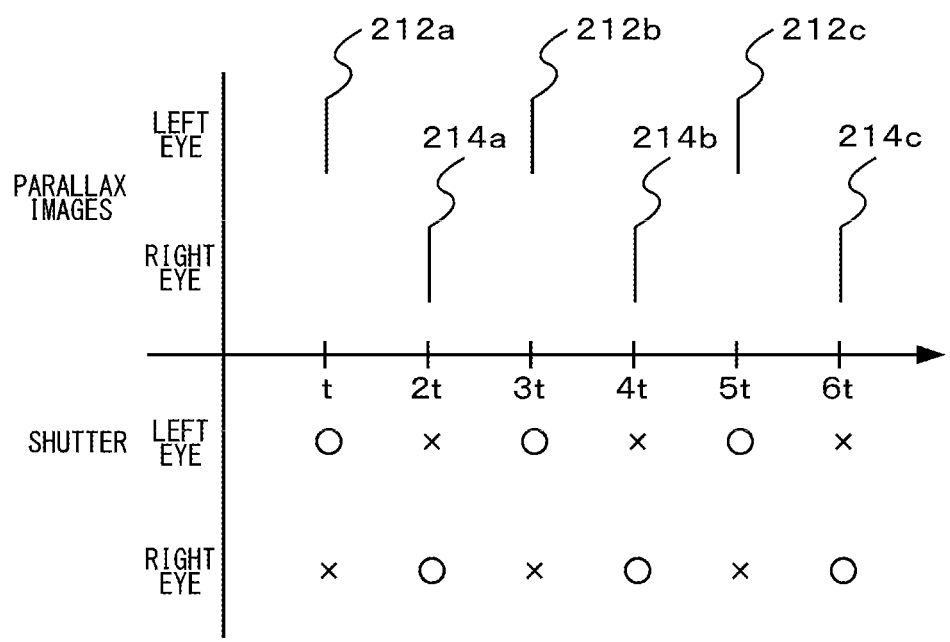
FIG. 3 is a diagram showing a relationship between the shutter operation timing of shutter glasses and the display timing of parallax images on a 3D television.

FIG. 3 is a diagram showing a relationship between the shutter operation timing of the shutter glasses 210 and the display timing of parallax images on the 3D television 206. A left-eye parallax image 212*a*, a left-eye parallax image 212*b*, and a left-eye parallax image 212*c*, which are generically referred to as "left-eye parallax image 212" or "left-eye parallax images 212", and a right-eye parallax image 214*a*, a right-eye parallax image 214*b*, and a right-eye parallax image 214*c*, which are generically referred to as "right-eye parallax image 214" or "right-eye parallax images 214", are displayed alternately at a predetermined time interval t (e.g., 1/120-second interval).

When the left-eye parallax image 212*a* is being displayed, the left-eye shutter of the shutter glasses 210 is open, and the right-eye shutter thereof closed. In FIG. 3, the "open" state of the shutter of the shutter glasses 210 is indicated by a symbol "○" (circle), and the "closed" state thereof by a symbol "x" (cross). As shown in FIG. 3, the display of parallax images on the 3D television 206 is synchronized with the opening and closing of the shutters of the shutter glasses 210. In this manner, the left-eye parallax images 212 are projected onto the left eye of the user, and the right-eye parallax images 214 onto the right eye of the user, with the result that the user can view perspective 3D images on the 3D television 206.

[3D Television]

Figure 4:
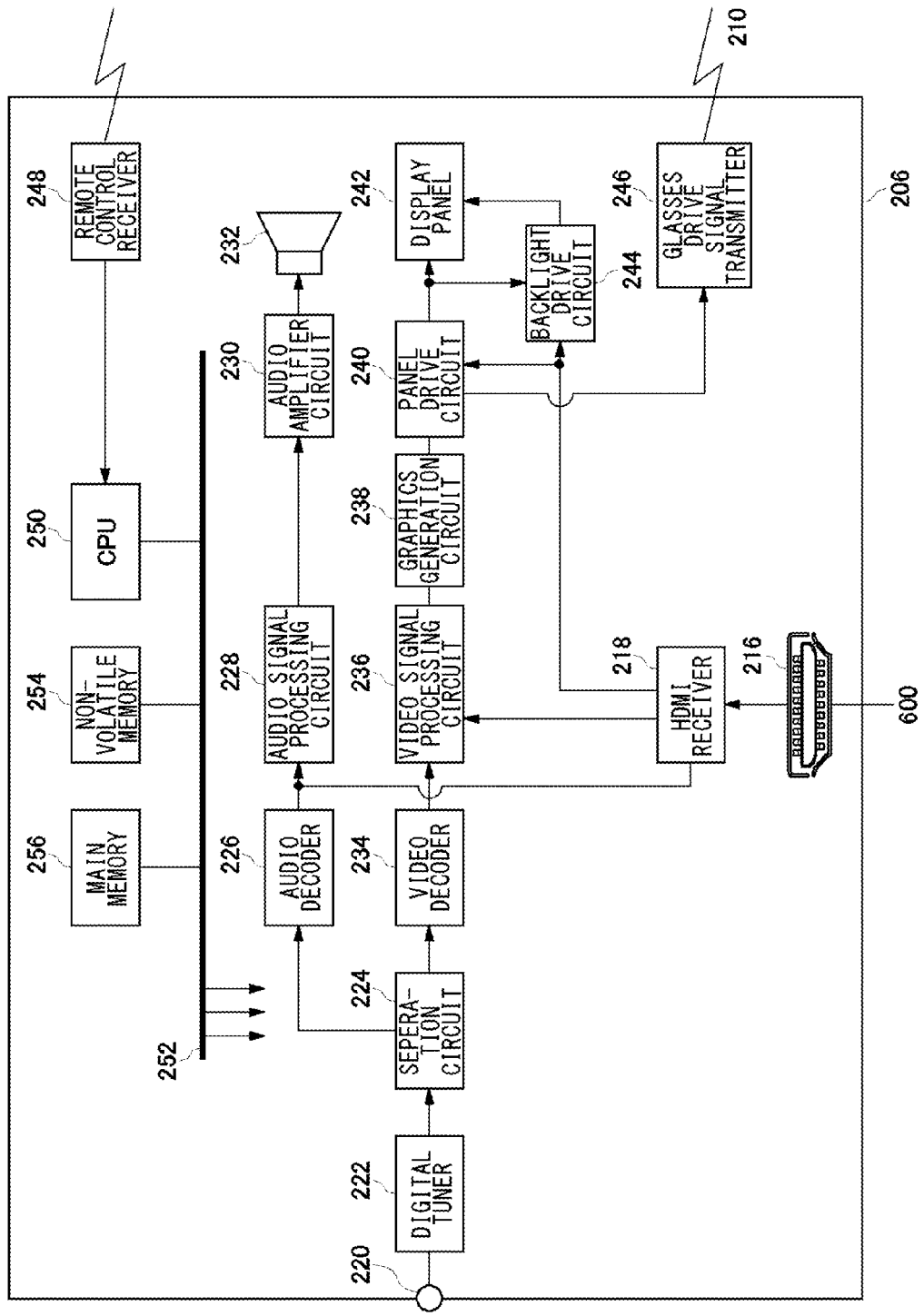
FIG. 4 is a schematic representation of a circuit configuration of a 3D television 206.

FIG. 4 is a schematic representation of a circuit configuration of a 3D television 206. An HDMI (High-Definition Multimedia Interface) terminal 216 is a terminal through which signals compliant with an HDMI standard, which include video, audio, and digital control signals, are inputted. An HDMI receiver 218 receives HDMI Rx and HDMI signals via the HDMI terminal 216 and separates them into packets of video signals, audio signals, control signals called InfoFrame, and the like.

The antenna input terminal 220 receives digital terrestrial television broadcasts and the like from a not-shown antenna. A digital tuner 222 extracts transmission data from the broadcasting signals received by the antenna input terminal 220 through the antenna. A separation circuit 224 separates video and audio streams from the transmission data.

An audio decoder 226, when the stream of audio data is not of Linear PCM (Pulse Code Modulation), but of MPEG-2 AAC (Advanced Audio Coding), Dolby Digital (trademark), or such other brand, decodes it into Linear PCM. The signals of Linear PCM thus converted are subjected to a processing such as the rearrangement of audio channels. The audio signal processing circuit 228 performs an audio signal processing such as the correction of sound quality.

An audio amplifier circuit 230 performs D/A (digital-to-analog) conversion for audio output to a speaker 232 to be discussed later or amplifies the analog signals according to a preset sound volume. The speaker 232 outputs the analog audio signals outputted by the audio amplifier circuit 230 as sound waves.

A video decoder 234 decodes a stream of video data, thereby generating the video data of frames constituting moving images. A video signal processing circuit 236 performs processings such as the improvement of image quality, the conversion of resolution, I/P (Interlace Progressive) conversion, and the like. A graphics generation circuit 238 superposes the display of a menu or various other information on a 3D television 206 on the video outputted from the video signal processing circuit 236. Note that the terms "video", "video images", and "moving images" (or simply "images") will be used interchangeably in the following description of this specification. Also, the terms "frame" and "image" will be used interchangeably.

A panel drive circuit 240 generates panel drive signals serving as triggers for displaying images outputted from the graphics generation circuit 238 on a display panel 242 of the 3D television 206. The panel drive circuit 240, that has timing information on the timing for the display of images on the display panel 242, outputs the timing information to a backlight drive circuit 244 and a glasses drive signal transmitter 246 to be discussed later.

When the backlight is of an LED (Light Emitting Diode) backlight system, the backlight drive circuit 244 controls the timing of backlight lighting based on the timing information acquired from the panel drive circuit 240. The backlight drive circuit 244 may light up the backlight with the timing and brightness differing for each region within the display panel 242.

The glasses drive signal transmitter 246 transmits timing signals to drive the aforementioned shutter glasses 210 based on the timing information acquired from the panel drive circuit 240. Note that the shutter glasses 210 open and close the left and right lenses thereof in response to the timing signals received from the glasses drive signal transmitter 246.

A non-volatile memory 254 stores a system program and the like for controlling the 3D television 206. A CPU (Central Processing Unit) 250 loads the system program from the non-volatile memory 254 via a bus 252. The CPU 250 performs an overall control of the 3D television 206 by executing the system program using a main memory 256 as a working memory.

The CPU 250 receives instructions from the user on the 3D television 206 via a remote control receiver 248 and transmits control commands to each of the above-described circuits via the bus 252. Each of the above-described circuits operates mainly based on the control commands sent from the CPU 250.

The display panel 242 of the 3D television 206 may be any of various types, such as a PDP (Plasma Display Panel) type using plasma and an LCD (Liquid Crystal Display) type using liquid crystals. However, the description of the embodiments of the present invention uses the LCD type principally.

On the display panel 242 of the 3D television 206, the display of video is generally updated by scanning line by line. For example, the updating of the states of the pixels of the display panel 242 starts with the topmost line thereof and the scanning progresses in the vertical direction until the bottommost line thereof is reached. Thus, when the left and right parallax images are to be updated alternately frame by frame, coexistence of the left and right parallax images will occur during the updating. Further, since the response of liquid crystals takes time, there occurs a time difference between the receiving of a signal for the updating of a pixel and the actual updating of the pixel.

Accordingly, employed on the display panel 242 of an LCD type may be such techniques as "double writing (rendering)" in which each of the left and the right parallax image is displayed twice consecutively or "black insertion" in which a monochromatic frame, such as a totally black frame, is displayed between the left and right parallax images.

Figure 5:
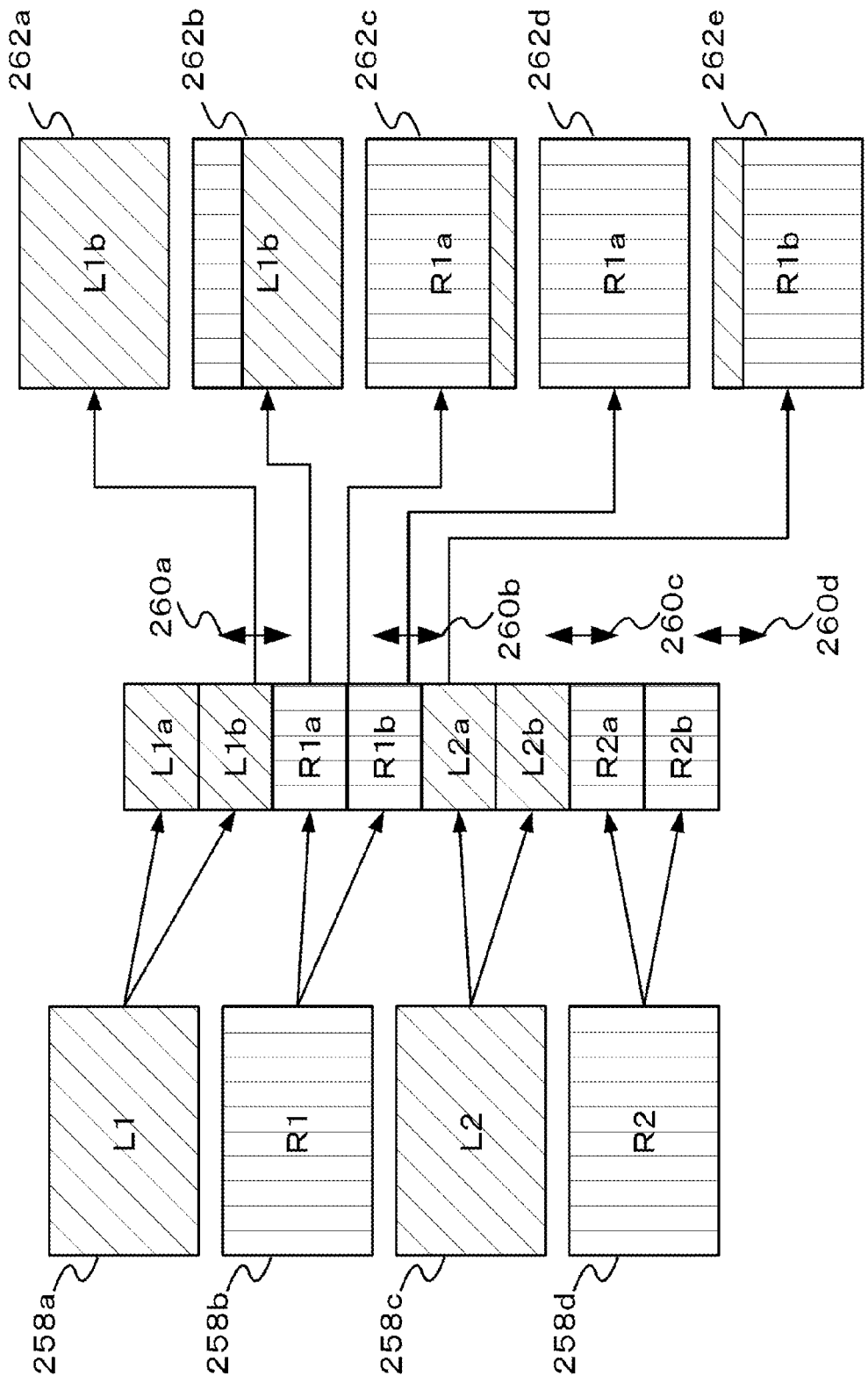
FIG. 5 is a diagram for explaining an image display system of a 3D liquid crystal television.

FIG. 5 is a diagram for explaining an image display system of a 3D liquid crystal television. FIG. 5 represents a case of the above-mentioned "double writing". In FIG. 5, the reference numeral 258 collectively denotes the parallax images to be displayed. The left-eye parallax images are represented by L (initial capital letter of Left), and the right-eye parallax images by R (initial capital letter of Right). Also, the reference numeral 262 collectively denotes the parallax images actually displayed on the display panel 242. And in this and following figures, the left-eye parallax images are indicated by oblique hatching, and the right-eye parallax images by vertical hatching.

The left-eye parallax image 258a is twice rendered (written) on the display panel 242. In FIG. 5, L1a represents the first rendering of a left-eye parallax image 258a, and L1b the second rendering thereof. Similarly, R1a represents the first rendering of a right-eye parallax image 258b, and R1b the second rendering thereof. The same applies to L2a, L2b and R2a, R2b.

As described above, the updating of images is done by scanning line by line. Therefore, at the point when the rendering of R1a is started, there remains the image of L1b on the display panel 242. An image 262b represents an image being displayed on the display panel 242 at this time. Also, as mentioned already, the response of liquid crystals takes time, and therefore there occurs a time difference between the receiving of a signal for the updating of a pixel and the actual updating of the pixel. As such, when all the rendering signals of R1a are received, the display of the entirety of R1 on the display panel 242 is not completed yet. An image 262c represents an image being displayed on the display panel 242 at this time.

As shown by an image 262d, the response time of liquid crystals will be elapsed by the time R1b is rendered half way, and thus the rendering of the lower part of the image not yet rendered in the image 262c will be completed, and the entirety of R1 will be displayed on the display panel 242. Accordingly, the left-eye shutter of the shutter glasses 210 is closed and the right-eye shutter thereof opened during the period when the entirety of R1 is displayed on the display panel 242. This is the period indicated by a reference numeral 260b in FIG. 5. For the same reason, during the periods indicated by reference numerals 260a and 260c, the right-eye shutter is closed and the left-eye shutter is opened. Also, during the period indicated by the reference numeral 260b, the left-eye shutter is closed and the right-eye shutter is opened. During the periods other than those indicated by the reference numerals 260, both the shutters of the shutter glasses 210 are closed.

As described above, in the "double writing" technique, the periods during which the entirety of either of left and right parallax images is displayed on the display panel 242 are created by displaying the left and right parallax images dual image by dual image. And those periods are synchronized with the opening and closing timing of the shutter glasses 210 such that proper parallax images are projected onto the human eyes.

Figure 6:
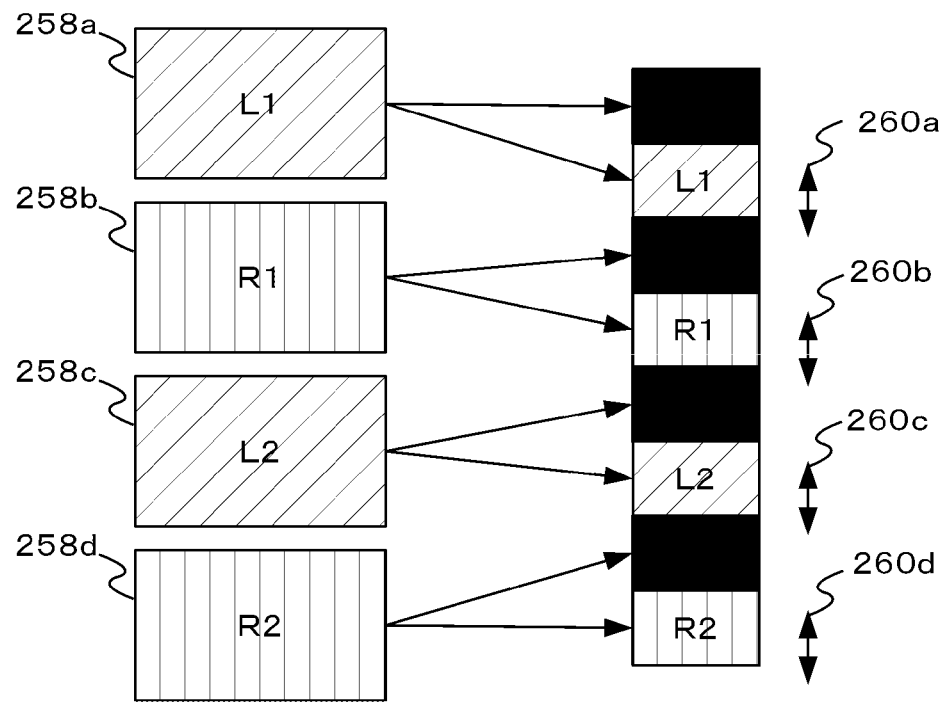
FIG. 6 is a diagram for explaining another image display system of a 3D liquid crystal television.

FIG. 6 is a diagram for explaining another image display system of the 3D liquid crystal television. FIG. 6 represents a case of the above-mentioned "black insertion". As already mentioned, the rendering on the display panel 242 of an LCD type is performed by scanning and there is a response time of liquid crystals. As a result, there occurs coexistence of a preceding parallax image 258 during the updating of a parallax image 258. A technique to solve this problem is the insertion of a black image between a left-eye parallax image 258a and a right-eye parallax image 258b. The coexistence of a parallax image 258 and a black image may cause a drop in general brightness of the parallax image 258, but the parallax images retain their function.

Whether the "double writing" technique shown in FIG. 5 or the "black insertion" technique shown in FIG. 6 is employed, it is necessary to drive the display panel 242 twice for the display of each of the left and right parallax images. Hence, if 3D images whose frame rate is n (Hz) are to be displayed, then it will be necessary to drive the display panel 242 at four times the frame rate n as shown in the following expression:

$$n \text{ (Hz)} \times 2 \text{ (double writing or black insertion)} \times 2 \text{ (left and right parallax images)} = 4n \text{ (Hz)}$$

[Standard Formats of HDMI v1.4a]

Figure 7A:
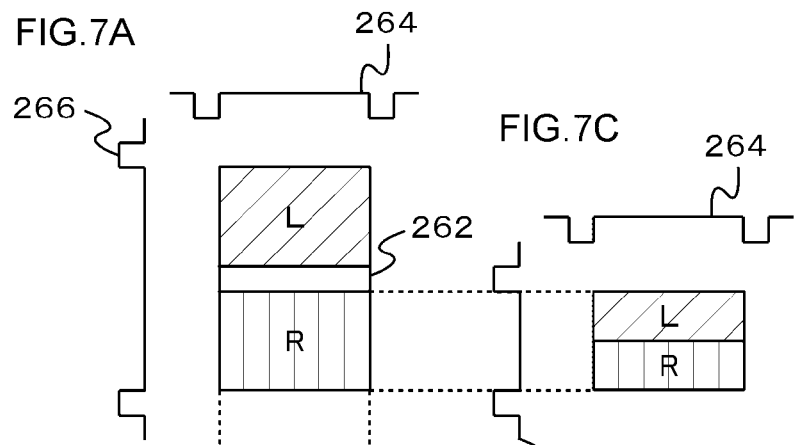
FIG. 7A shows a frame packing format in the HDMI standard.
Figure 7C:
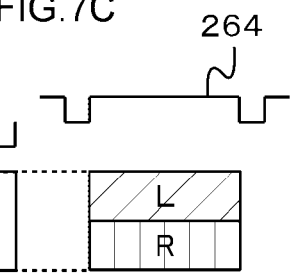
FIG. 7C shows a top-and-bottom format in the HDMI standard.
Figure 7B:
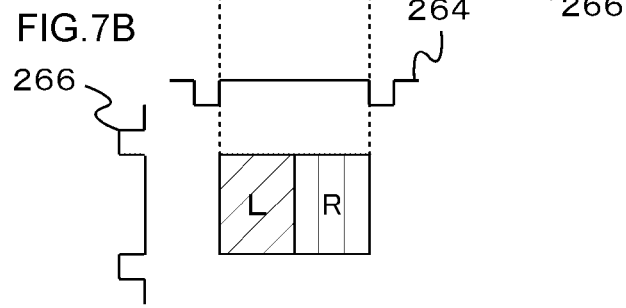
FIG. 7B shows a side-by-side format in the HDMI standard.

FIGS. 7A to 7C are diagrams showing a group of standard formats of 3D images by HDMI v1.4a.

FIG. 7A shows a frame packing format. The frame packing is a format for transmitting a full-size left-eye parallax image L and a full-size right-eye parallax image R as a single frame. More specifically, a blank portion 262 is set directly below a left-eye parallax image L before a right-eye parallax image R is placed directly below the blank portion 262. Accordingly, while the horizontal synchronization signal 264 used in the rendering is of the same length as one for the rendering of a single parallax image 258, the vertical synchronization signal 266 is of the length of two parallax images 258 plus the blank portion 262.

FIG. 7B shows a side-by-side format. The side-by-side is a format for transmitting a combination of a left-eye parallax image L and a right-eye parallax image R whose vertical widths are respectively halved to reduce them into the same size as a single full-size parallax image 258. A signal indicating the side-by-side format is transmitted as part of the control signal of HDMI.

FIG. 7C shows a top-and-bottom format. The top-and-bottom is a format for transmitting a combination of a left-eye parallax image L and a right-eye parallax image R whose horizontal widths are respectively halved to reduce them into the same size as a single full-size parallax image 258. A signal indicating the top-and-bottom format is transmitted as part of the control signal of HDMI.

Figures 8, 9:
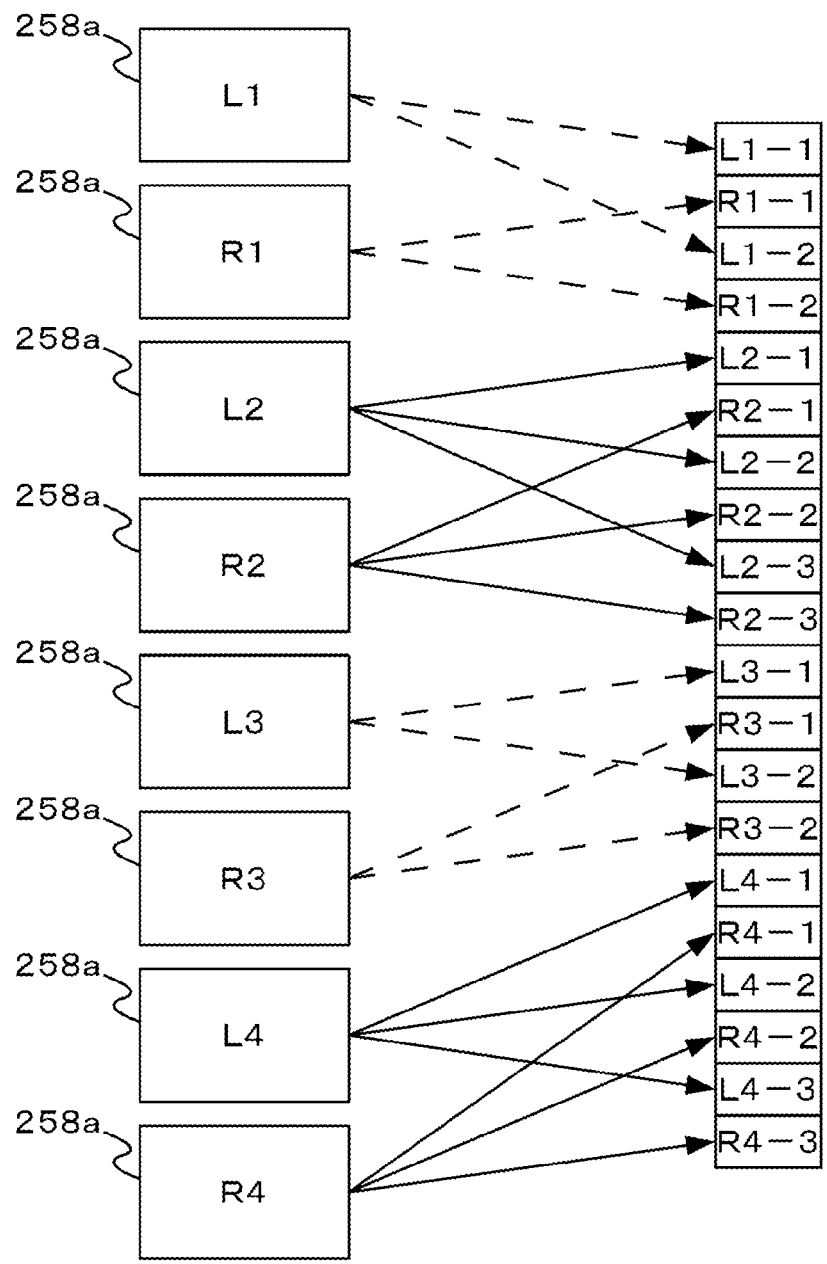
FIG. 8 is a list of mandatory formats related to 3D images in a HDMI standard.
FIG. 9 is a diagram for explaining a frame rate conversion method.

FIG. 8 is a list of mandatory formats related to 3D images in the HDMI v1.4a standard. In the HDMI v1.4 standard, it is mandatory that a sink device (e.g., an HDMI receiver, a television set, or the like) should be able to receive the frame packing, side-by-side, and the top-and-bottom video formats of resolutions and frame rates as shown in FIG. 8. Besides these, optional formats, resolutions, and frame rates may be supported. A source device (e.g., an HDMI transmitter, a Blu-ray player, a game device, or the like) is allowed to output only the supported formats, resolutions, and frame rates via HDMI by verifying the formats, resolutions, and frame rates supported by the source device.

[Flickering and the Conversion of Frame Rate]

When the frame rate of images is within a certain range, a phenomenon called "flicker" of images may occur. The "flicker" is a phenomenon where the flickering that moves back and forth in small motions is perceived by a viewer on a screen when the frequency of rewrites of images is so low that the human eyes can perceive it accordingly. In general, the flickering is recognizable by the human eyes if the frame rate of images is in a range of about 10 Hz to about 50 Hz.

As shown in FIG. 8, the frame rate of 24 Hz is commonly used for 3D video images in the content of movies. Thus, when the video images are presented in the frame rate of the content thereof, the flickering phenomena may be conspicuous depending on users. Accordingly, the frame rate is converted and then 3D images are played back when the 3D images of the content of movies are displayed by the 3D television 206.

If, for example, frames are interpolated so as to generate new frames the number of which is now three times the given number thereof and if the 3D images are presented in the frame rate of 72 Hz that exceeds a range of 10 Hz to 50 Hz (namely, exceeds the upper limit of this range), the flickering can be suppressed. As already mentioned, if the 3D video images whose frame rate is 72 Hz are to be displayed on the LCD type display panel 242, the display panel 242 must be driven in 288 Hz (=72 Hz×4). However, most of time it is difficult to drive the display panel in 288 Hz. In the light of this situation, common in practice are cases where the frame rate of 24 Hz is converted to 60 Hz so as to playback the 3D images.

FIG. 9 is a diagram for explaining a frame rate conversion method. FIG. 9 is a diagram for explaining a frame rate conversion method called "2-to-3 conversion". In the "2-to-3 conversion", a combination of left-eye parallax image L and right-eye parallax image R is set as one unit. A certain combination thereof is displayed twice consecutively and displayed, and then the subsequent combination thereof is displayed thrice consecutively. In FIG. 9, the left-eye parallax image L1 and the right-eye parallax image R1 are each displayed twice as L1-1 and L1-2 and as R1-1 and R1-2, respectively. On the other hand, the left-eye parallax image L2 and the right-eye parallax image R2 are each displayed thrice as L2-1, L2-2 and L2-3 and as R2-1, R2-2 and R2-3, respectively. In FIG. 9, the twice-displayed combinations are represented by dashed arrows, whereas the thrice-displayed combinations are represented by solid arrows.

In this manner, the number of frames displayed per second is displayed by switching it between twice and three times, so that the 3D video images whose frame rate is 24 Hz is finally converted to those whose frame rate is 60 Hz that is substantially 2.5 times 24 Hz.

Figure 10:
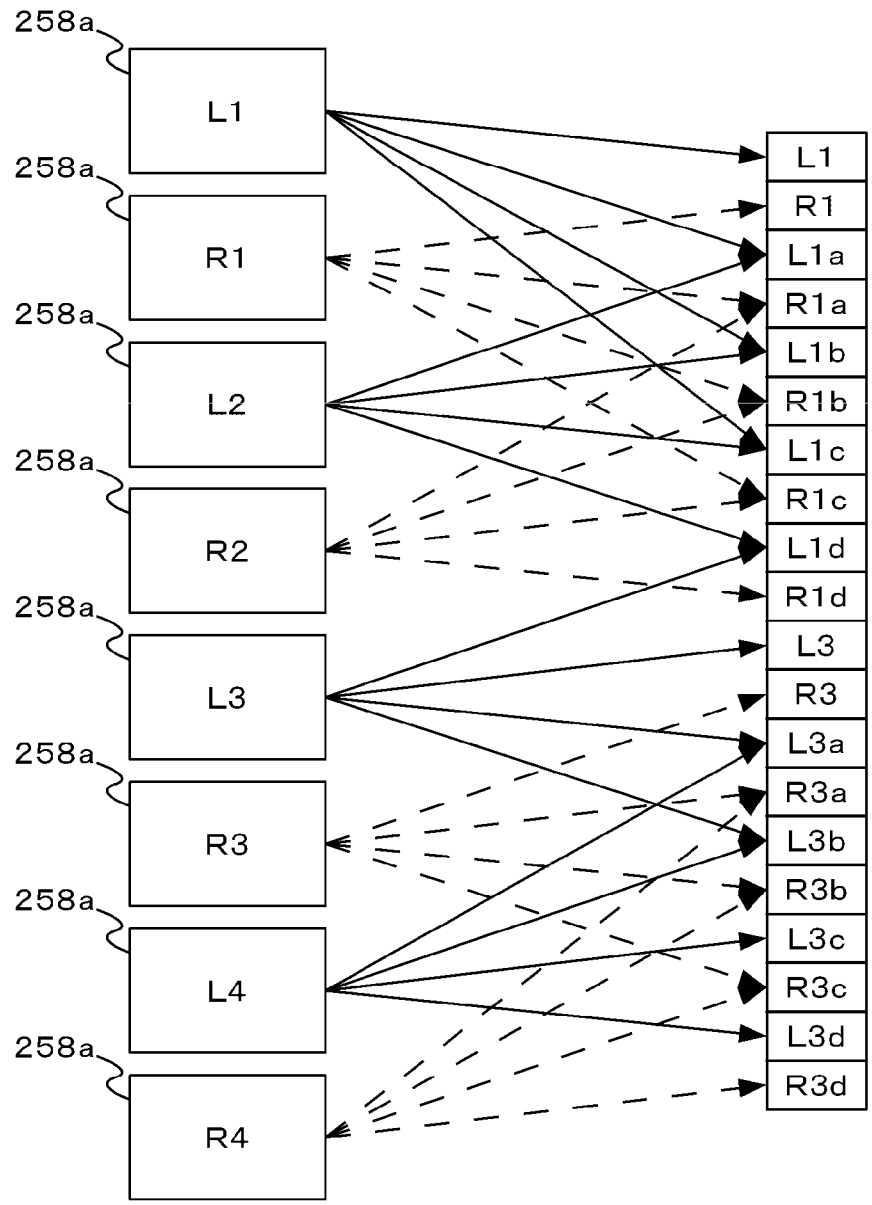
FIG. 10 is a diagram for explaining another frame rate conversion method.

FIG. 10 is a diagram for explaining another frame rate conversion method using a frame interpolation technique. FIG. 10 is a diagram for explaining a method in which the frame rate of "2 frames per unit time" is converted to that of "5 frames per unit time" using a frame interpolation technique. As shown in FIG. 10, the five frames that are L1, L1$a$, L1$b$, L1$c$, and L1$d$ are generated using the two frames that are a left-eye parallax image L1 and a left-eye parallax image L2 by use of a technique such as a motion estimation method. Similarly, the five frames that are R1, R1$a$, R1$b$, R1$c$, and R1$d$ are generated using the two frames that are a right-eye parallax image R1 and a right-eye parallax image R2. It is indicated in FIG. 10 that frame(s) located at the starting point of arrow is/are used for the interpolation of frame(s) located at the end point of arrow. For example, L1$a$ is produced by L1 and L2.

Note that L3 is used in the generation of L1$d$ but, as a whole, the generation of two frames per unit time are converted to the generation of five frames per unit time. As a result, 3D video images whose frame rate is 24 Hz is converted to those whose frame rate is 60 Hz.

[3D Video Playback Apparatus]

Figure 11:
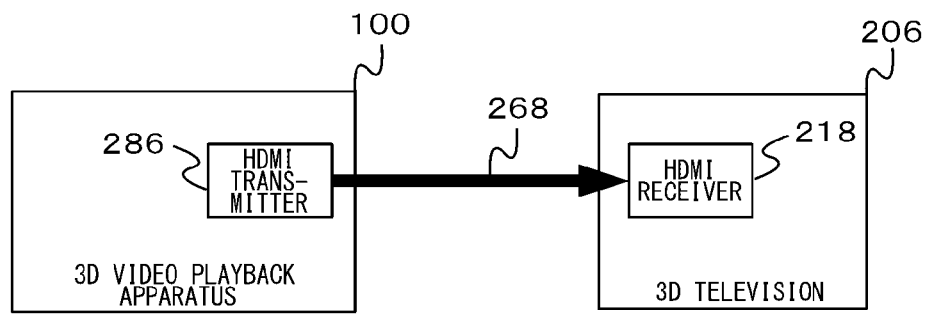
FIG. 11 schematically illustrates a structure of equipment used for a 3D image display system according to an embodiment.

FIG. 11 schematically illustrates a structure of equipment used for the 3D image display system 300 according to an embodiment. The equipment used for the 3D video display system 300 includes a 3D video display playback apparatus 100 and a 3D television 206. The 3D video playback apparatus 100, which includes an HDMI transmitter 286 (HDMI Tx) described later, communicates with an HDMI receiver 218 (HDMI Rx) via an HDMI cable 268.

Figure 12:
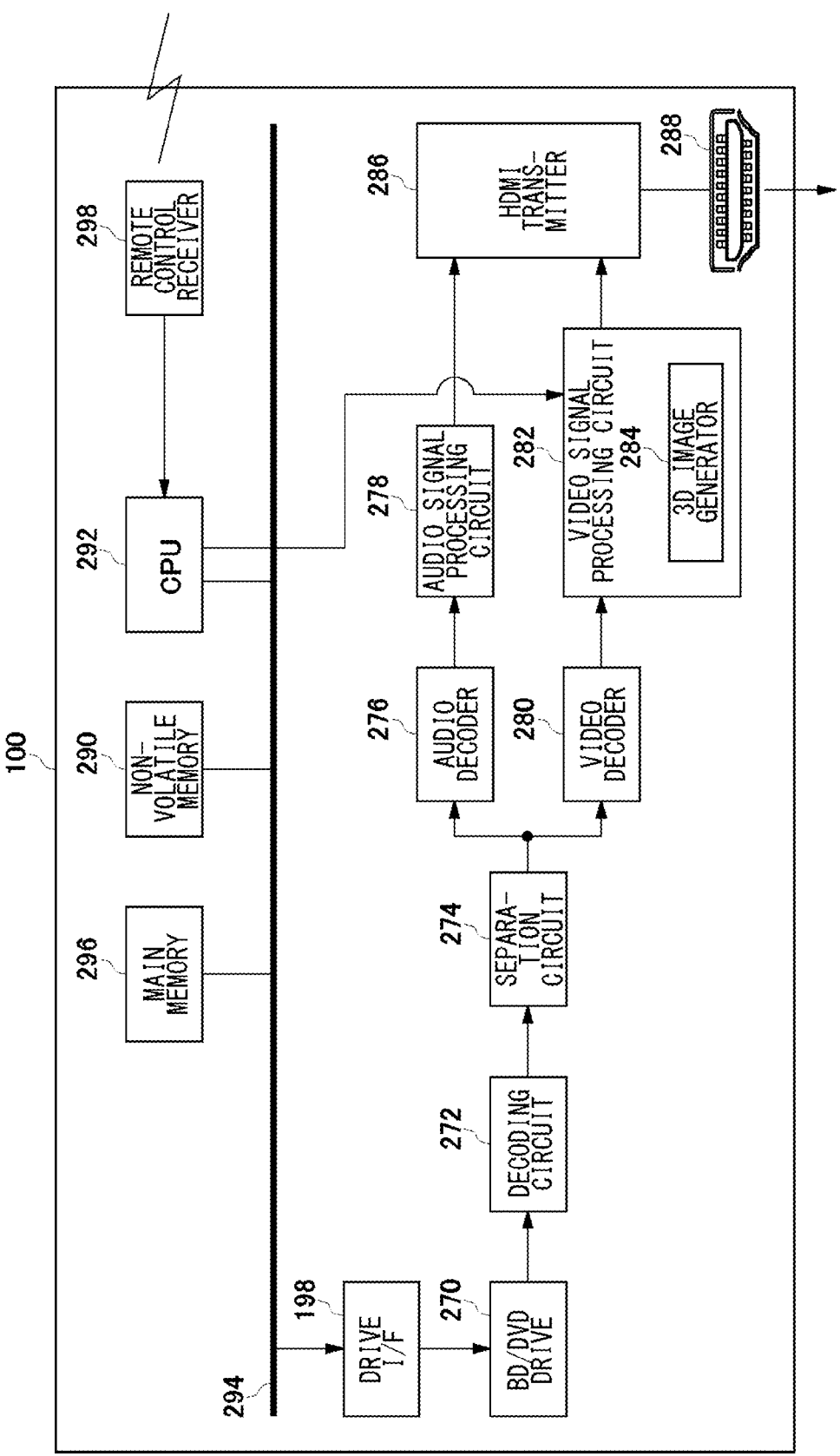
FIG. 12 schematically illustrates a circuit configuration of a 3D video playback apparatus according to an embodiment.

FIG. 12 schematically illustrates a circuit configuration of a 3D video playback apparatus according to an embodiment.

A BD/DVD (Blu-ray Disc (trademark)/Digital Versatile Disc) drive 270 reads data from an optical medium. A decoding circuit 272 decrypts the encryption such as AACS (Advanced Access Content System) and CSS (Content Scramble System) and converts the data into plain text where no encryption is performed.

From the data read out from the optical medium (the data where audio, video images and the like are multiplexed together), the separation circuit 274 retrieves streams including video images such as MPEG (Moving Picture Experts Group) images, AVC (Advanced Video Coding) images and MVC (Multi-View Coding Digital) images, audio such as Linear PCM, Dolby Digital and DTS (Digital Theater System) (trademarks), and other data such as captions or subtitles.

An audio decoder 276, when the stream of audio data is not of Linear PCM, but of Dolby Digital, DTS, or such other brand, decodes it into Linear PCM. The signals of Linear PCM thus converted are subjected to a processing such as the rearrangement of audio channels. The audio signal processing circuit 228 performs an audio signal processing such as the correction of sound quality.

An audio signal processing circuit 278 performs an audio signal processing, such as audio mixing, downmixing and sampling rate conversion, on the interactive audio of main sound channel, second sound channel, button sound and the like.

A video decoder 280 decodes video stream such as the stream of MPEG, AVC, MVC and VC-1 images so as to generate the image of each frame of the video images. A video signal processing circuit 282 corrects the image quality of frames acquired from the video decoder 280, converts the image size and the resolution, converts the color space, combines a main image and sub images together, and performs other processings. Also, the video signal processing circuit 282 superimposes the images of OSD (On-Screen Display) with each other. The video signal processing circuit 282 further includes a 3D image generator 284 that converts the image data acquired from the video decoder 280 into a 3D output format when the 3D images are to be outputted.

The HDMI transmitter 286 (HDMI Tx) transmits the signals generated by the audio signal processing circuit 278 and the video signal processing circuit 282 as HDMI transmitting signals via an HDMI terminal 288.

A non-volatile memory 290 stores a system program and the like for controlling the 3D vdieo playback apparatus 100. A CPU 292 loads the system program from the non-volatile memory 290 via a bus 252. The CPU 292 performs an overall control of the 3D video playback apparatus 100 by executing the system program using a main memory 296 as the working memory. For example, a drive I/F (InterFace) acquires an instruction, with which to control the BD/DVD drive 270, from the CPU 292 via the bus 294 and controls the BD/DVD drive 270.

The CPU 292 receives instructions from the user on the 3D image playback apparatus via a remote control receiver 298 and transmits control commands to each of the above-described circuits via the bus 294. Each of the above-described circuits operates based on the control commands sent from the CPU 292. The processing of format of images to be sent by the HDMI transmitter 286 and the packet content including the control signals, the output timing, the switching of resolutions, and the like are performed by the CPU 292 and the like.

Figures 13, 14:
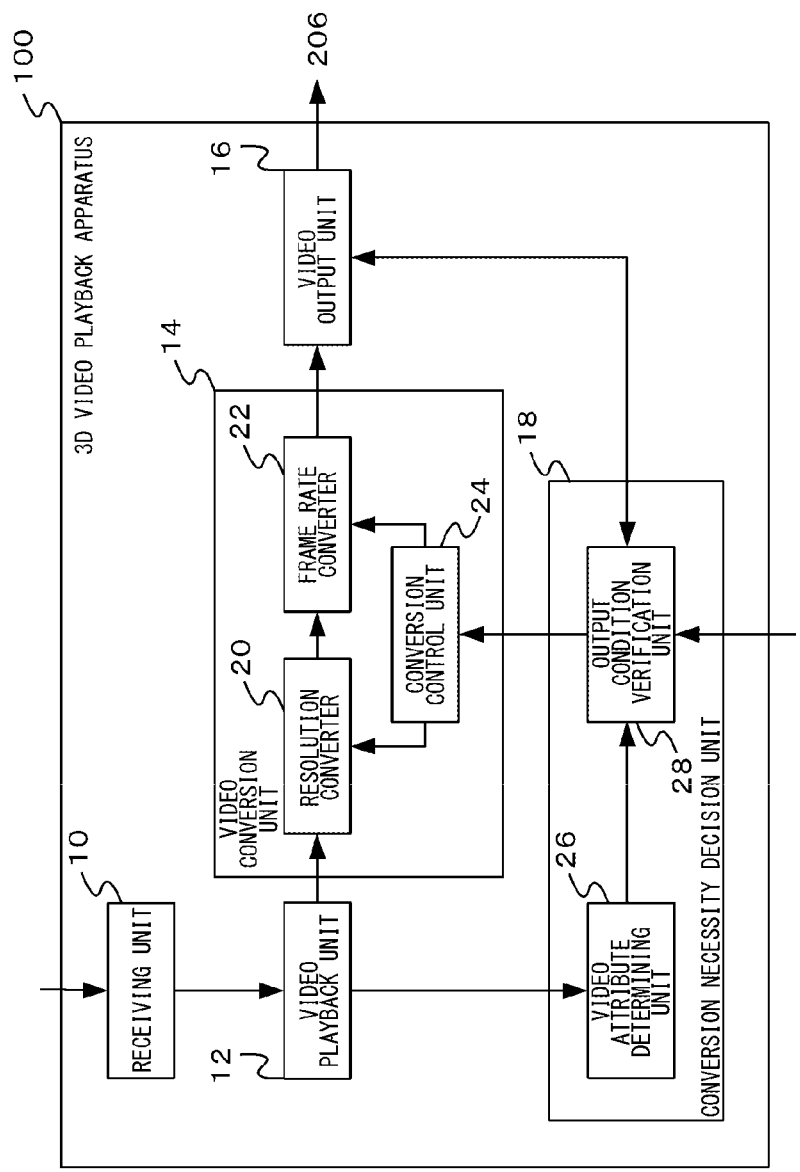
FIG. 13 schematically illustrates a functional structure of a 3D video playback apparatus according to an embodiment.
FIG. 14 is an exemplary display that prompts a user to select whether to covert the frame rate or not.

FIG. 13 schematically illustrates a functional structure of a 3D video playback apparatus 100 according to an embodiment. The 3D video playback apparatus 100 includes a receiving unit 10, a video playback unit 12, a video conversion unit 14, and a video output unit 16, and a conversion necessity decision unit 18.

The receiving unit 10 receives user's instructions concerning the 3D video playback apparatus 100. The receiving unit 10 is mainly realized by the remote control receiver 298 and the CPU 292 shown in FIG. 12. The video playback unit 12 plays back images stored in a Blu-ray Disc (trademark) or other media. The video playback unit 12 is mainly realized by the BD/DVD drive 270, the decoding circuit 272, the separation circuit 274, and the video decoder 280 shown in FIG. 12.

The conversion necessity decision unit 18 acquires the attribute of video images played back by the video playback unit 12 and determines whether the frames of the video images are to be converted or not. Thus, the conversion necessity decision unit 18 includes a video attribute determining unit 26 and an output condition verification unit 28.

If the images played back by the video playback unit 12 are 3D images that include left-eye parallax images and right-eye parallax images obtained when an object in the 3D space is viewed from different viewpoints, the video attribute determining unit 26 will determine whether or not the frame rate of the 3D images is within a predetermined frame rate range at which a flicker is likely to occur. The predetermined frame rate range may be a range of 10 Hz to 50 Hz, for instance.

If the video playback unit 12 determines that the frame rate thereof is within the predetermined frame rate range at which a flicker is likely to occur, the output condition verification unit 28 will output an instruction instructing the frame rate thereof to be raised, to the video conversion unit 14. The function of the conversion necessity decision unit 18 is carried out as the CPU 250 reads out a program, for use in determining the conversion necessary, stored in the non-volatile memory 254 shown in FIG. 12 and executes the read-out program.

The video conversion unit 14 processes the video signals, such as the conversion of resolution of videos played back by the video playback unit 12 and the conversion of frame rate thereof, based on the instruction given from the output condition verification unit 28. Thus, the video conversion unit 14 includes a resolution converter 20, a frame rate converter 22, and a conversion control unit 24. The video conversion unit 14 is realized mainly by the video signal processing circuit 282.

The conversion control unit 24 acquires from the output condition verification unit 28 an instruction as to whether or not the video signal processing is to be performed on the videos played back by the video playback unit 12. When the instruction indicating that the resolution of images to be played back be converted is given from the conversion control unit 24, the resolution converter 20 converts the resolution of the images. If the frame rate of the images played back by the video playback unit 12 is within the predetermined frame rate range at which a flicker is likely to occur, the frame rate converter 22 will raise the frame rate of the images until the frame rate thereof exceeds the upper limit of the predetermined frames rate range. More specifically, the frame rate of the images is converted to 60 Hz or more. The frame rate may be converted using the 2-to-3 conversion or interpolation technique, for instance.

As described earlier, the higher the frame rate is, the less the flickering is likely to occur. Thus, the frame rate converter 22 raises the frame rate of the images played back by the video playback unit 12. However, many of ICs (Integrated Circuits) that generate TMDS (Transition Minimized Differential Signaling) clocks in the HDMI transmission are designed based on the premise that the two dimensional images, whose effective scanning lines are 1080, are transmitted at 60 Hz. For that reason, there are cases where it is feasible to transmit the video signals as shown in FIG. 8 but it is difficult to input and output the 3D video images whose scanning lines are 1080.

In the light of the above, the conversion control unit 24 has the frame rate converter 22 raise the frame rate of the 3D images played back by the video playback unit 12 and determines whether or not the capacity of a circuit for processing the 3D images becomes insufficient as a result of the raised frame rate thereof. If the circuit for processing the 3D images becomes insufficient, the resolution converter 20 will be instructed to lower the resolution of the 3D images until the capacity thereof is within a predetermined processing capacity range.

The video output unit 16 outputs the images acquired from the video conversion unit 14, to a display device such as the 3D television 206. The video output unit 16 is realized by the HDMI transmitter 286 and the HDMI terminal 288 shown in FIG. 12.

There may be cases where some users prefer to watch the 3D videos in a high resolution even though flicker should occur. Thus, the output condition verification unit 28 may output a display prompting the user to select whether or not the conversion of frame is to be done, to the display device via the video output unit 16 so as to receive the selection from the user. FIG. 14 is an exemplary display that prompts the user to select whether to covert the frame rate or not. Outputting the display shown in FIG. 14 to the display device allows receiving the user's selection. The output condition verification unit 28 outputs the acquired user's instruction to a conversion control unit 24.

FIG. 13 illustrates a functional structure to realize the 3D video playback apparatus 100 according to the embodiment, and other structural components are omitted in FIG. 13. Each element shown in FIG. 13 and described as a functional block for performing various processings may be implemented hardwarewise by a CPU, main memory and other LSIs, and softwarewise by image processing programs or the like loaded in the main memory. Therefore, it is understood by those skilled in the art that the functional blocks may be implemented by a variety of manners including hardware only, software only or a combination of both, and are not limited to any particular one.

Figure 15:
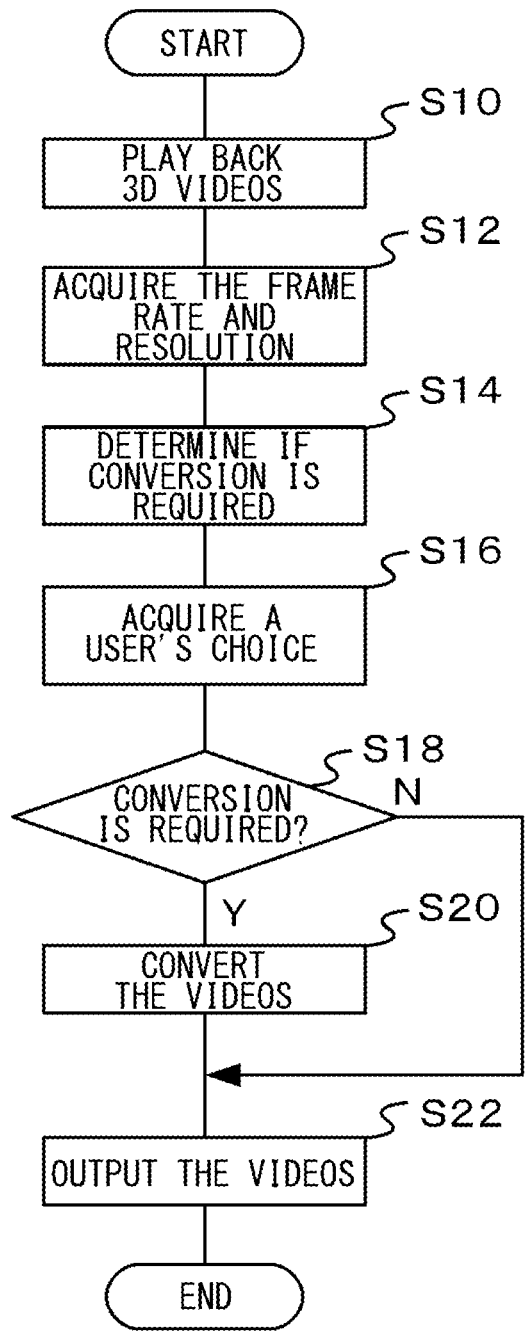
FIG. 15 is a procedure for processing a 3D video display according to an embodiment.

FIG. 15 is a flowchart showing a procedure for processing the 3D video display according to an embodiment. That is, FIG. 15 is a flowchart showing a procedure for processing the displaying of video images in the 3D video playback apparatus 100 according to the embodiment. In the following flowcharts, the procedure of each structural component is shown using S (the capital letter of "Step"), which means a step, and numbers combined. If a determining process is executed in a processing indicated by the combination of S and a number and if the decision result is positive, "Y" (the capital letter of "Yes") will be appended like "(Y of S18)". If, on the other hand, the decision result is negative, "N" (the capital letter of "No") will be appended like "(N of S18)". The processing of the flowchart shown in FIG. 15 starts when the video playback unit 12 plays back 3D images.

The video playback unit 12 plays back the 3D images stored in the Blu-ray Disc (trademark) or the like (S10). The video attribute determining unit 26 acquires from the video playback unit 12 the frame rate and the resolution of the 3D images played back by the video playback unit 12 (S12). The output condition verification unit 28 determines whether the frame rate of the images is to be converted or not, based on the frame rate and the resolution acquired by the video attribute determining unit 26 (S14). The output condition verification unit 28 presents the decision result to the user and receives an instruction selection from the user (S16).

If the conversion of the frame rate thereof is required (Y of S18), the images will be converted in a manner such that the resolution converter 20 lowers the resolution of the images and the frame converter 33 raises the frame rate of the images outputted from the resolution converter 20. If the conversion of the frame rate thereof is not required (N of S18), no particular process is performed by the resolution converter 20 and frame rate converter 22. The video output unit 16 outputs the video images acquired from the video conversion unit 14, to the display device (S22). As the video output unit 16 has outputted the video images, the processing in this flowchart will be terminated.

An operation implementing the above-described structure is as follows. In the 3D video playback apparatus 100 according to the embodiments, the user selects whether the frame rate or the like of video images set beforehand according to a system is to be converted or not. Alternatively, the selection may be made by using the OSD. If the user wishes to watch the 3D images whose effective scanning lines are 1080 and whose frame rate is 24 Hz, the conversion necessity decision unit 18 will acquired information set according to the system. If the user selects to convert the frame rate or the like thereof, the video conversion unit 14 will raise the frame rate.

As described above, by employing the present embodiment, the occurrence of flicker can be suppressed by raising the frame rate of images at which a flicker is perceivable. Also, where the resolution needs to be lowered in order to raise the frame rate, the user will be informed accordingly, so that the images can be converted according to the user's inclination.

The present invention has been described based upon illustrative embodiments. The above-described embodiments are intended to be illustrative only and it will be obvious to those skilled in the art that various modifications to the combination of constituting elements and processes could be developed and that such modifications are also within the scope of the present invention.

[Modifications]

Figure 16:
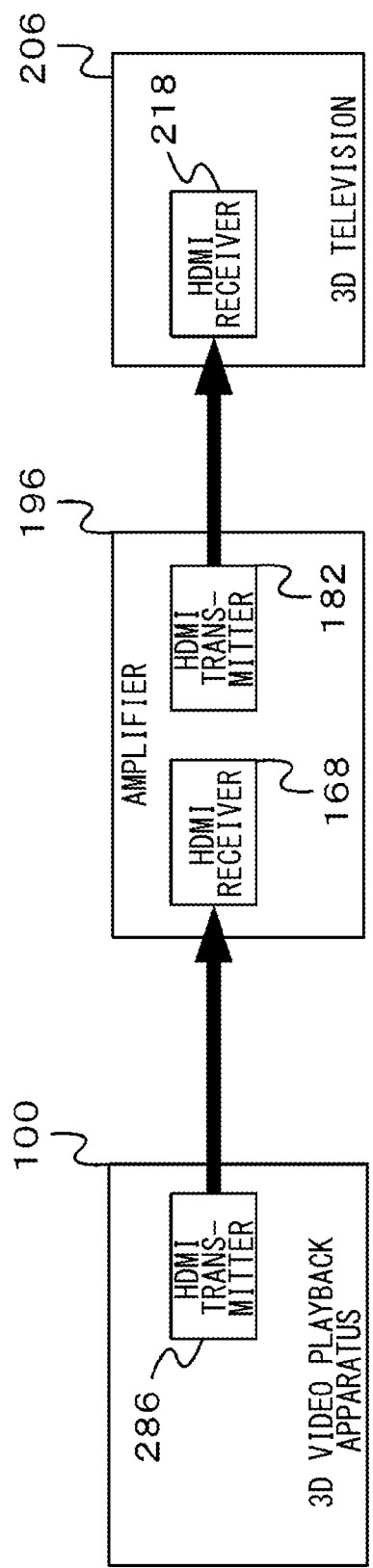
FIG. 16 schematically illustrates another structure of equipment used for a 3D image display system according to an embodiment.

FIG. 16 schematically illustrates another structure of equipment used for the 3D image display system 300 according to another embodiment. The equipment used for the 3D video display system 300 according to this modification includes a 3D video display playback apparatus 100, amplifier 196, and a 3D television 206. The 3D video playback apparatus 100, which includes an HDMI transmitter 286 (HDMI Tx), communicates with the amplifier 196 via an HDMI cable 268a.

In the example of FIG. 11, the signals such as video and audio signals outputted from the 3D video playback apparatus 100 are directly inputted to the 3D television 206. In this modification, however, those signals such as video and audio signals undergo a signal processing by the amplifier 196 before they are inputted to the 3D video playback apparatus 100. This modification is advantageously effective in that a higher level of audio signal processing is done than the processing done within the 3D video playback apparatus 100 or the 3D television 206.

Figure 17:
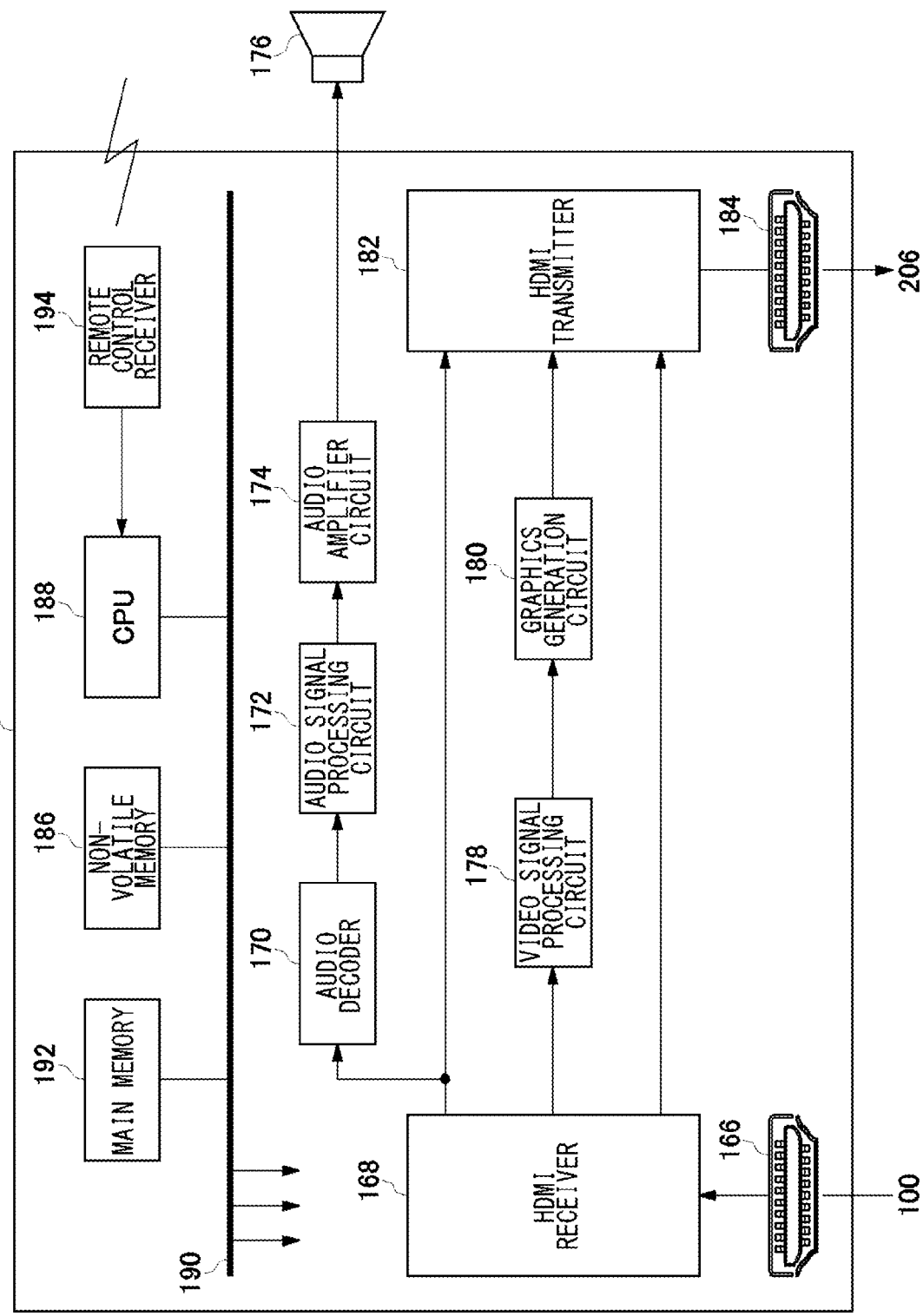
FIG. 17 schematically illustrates a circuit configuration of an amplifier according to another embodiment.

FIG. 17 schematically illustrates a circuit configuration of the amplifier 196 according to the embodiment.

An HDMI receiver 168 (HDMI Rx) acquires HDMI signals via the HDMI terminal 166 and separates them into packets of video signals, audio signals, control signals, and the like.

An audio decoder 170, when the stream of audio data is not of Linear PCM, but of Dolby Digital (trademark), DTS (trademark) or the like, decodes it into Linear PCM. The signals of Linear PCM thus converted are subjected to a processing such as the rearrangement of audio channels. The audio signal processing circuit 228 performs an audio signal processing such as the correction of sound quality.

An audio signal processing circuit 172 performs an audio signal processing, such as sound field correction and sound quality improvement, including audio mixing, downmixing and sampling rate conversion on the interactive audio of main sound channel, second sound channel, button sound and the like.

An audio amplifier circuit 174 performs D/A conversion for audio output to a speaker 176 or amplifies the analog signals according to a preset sound volume. Also, there may be cases where the audio is not played back through the amplifier 196 but, instead, the audio is outputted from a signal device such as the 3D television 206. In such a case, the packets on audio, such as audio data and audio control signals, acquired by the HDMI receiver 168 are not outputted to the aforementioned audio decoder 170, audio signal processing circuit 172 and audio amplifier circuit 174 but are directly transferred to the sink device such as the 3D television 206.

A video signal processing unit 178 performs such processings as the sound quality improvement and resolution conversion of video data acquired by the HDMI receiver 168 and the conversion between various formats for 3D images. A graphics generation circuit 180 superimposes a menu of the amplifier 196 and a display for presenting various items of information on the images outputted from the video signal processing unit 178.

An HDMI transmitter 182 (HDMI Tx) transmits the signals generated by the graphics generation circuit 180 as HDMI transmitting signals via an HDMI terminal 184. Also, when audio is to be outputted from a sink device such as the 3D television, the audio data acquired by the HDMI receiver 168 and the packets on audio, such as audio data and audio control signals, acquired by the HDMI receiver 168 are transmitted via an HDMI terminal 184.

A non-volatile memory 186 stores a system program and the like for controlling the amplifier 196. A CPU 188 loads the system program from the non-volatile memory 186 via a bus 190. The CPU 188 performs an overall control of the amplifier 196 by executing the system program using a main memory 192 as a working memory. For example, a program used to check the control signal read out of the non-volatile memory 186 is executed by the CPU 188. As a result, the content of the control signal sent from the 3D video playback apparatus 100 is checked and then the content thereof is changed as necessary before it is outputted to the 3D television 206.

The CPU 188 receives instructions from the user on the amplifier 196 via a remote control receiver 194 and transmits control commands to each of the above-described circuits via the bus 190. Each of the above-described circuits operates based on the control commands sent from the CPU 188. The processing of format of images to be sent by the HDMI transmitter 182 and the packet content including the control signals, the output timing, the switching of resolutions, and the like are performed by the CPU 188 and the like.

In the above-described description, a description is given of a case where the video signal processing such as the frame conversion is performed in the 3D video playback apparatus 100 and the amplifier 196. However, if the same video signal processing can be done by the 3D television 206, a modification may be such that the video images are sent to the 3D television without having the 3D video playback apparatus 100 and the amplifier 196 perform the video signal processing. The output condition verification unit 28 acquires EDID (Extended Display Identification Data) from the 3D television 206 and then analyzes the content of EDID. If a flag indicating that the video signal processing is unnecessary is set as a result of the analysis, the modification can be realized in a manner such that no video signal processing is carried out by 3D video playback apparatus 100 and the amplifier 16. Since a video signal processing suitable for the 3D television 206 can be carried out, this modification is advantageous in that the video images can be watched with a satisfactory image quality.

Alternatively, if the flag indicating that the video signal processing is unnecessary is set in the EDID acquired from the 3D television 206, an arrangement may be such that said flag is presented to the user and then a selection is so made that the video signal processing can be carried out by only one of three units that are the 3D video playback apparatus 100, the amplifier 196, and the 3D television 206. FIG. 18 is an exemplary display prompting the 3D television 206 to choose whether the frame rate is to be converted or not. This can be realized by displaying the OSD shown in FIG. 18 on the 3D television 206 and having the user make the selection.

If the user selects to process the video signals in the amplifier 196, it may be conceivable that a flag, indicating that the video signal processing is required, is set in the control signal inputted from the 3D television 206 to the amplifier 196. In such a conceivable case, the flag, indicating that the video signal processing is required, may be set off in the control signal inputted to the amplifier 196 by having the CPU 188 in the amplifier 196 execute a dedicated program.

EXPLANATION OF REFERENCE NUMERALS

10 Receiving unit
12 Image playback unit
14 Image conversion unit
16 Image output unit
18 Conversion necessity decision unit
20 Resolution determining unit
22 Frame rate converter
24 Conversion control unit
26 Video attribute determining unit
28 Output condition verification unit
100 3D video playback apparatus
206 3D television
208 Glasses drive signal oscillating unit
210 Shutter glasses
300 3D image display system

INDUSTRIAL APPLICABILITY

The present invention is used for apparatus and method for playing back three-dimensional video images.

The invention claimed is:

1. A three-dimensional video playback method, wherein it is determined whether or not a frame rate of three-dimensional (3D) images is within a predetermined frame rate range at which a flicker is likely to occur, each of the images being a shutter-type 3D image displayed such that a left-eye parallax image and a right-eye parallax image are alternately displayed in time division, and when the frame rate of the 3D images is within the predetermined frame rate range, the frame rate of the left-eye parallax images and the right-eye parallax images is raised until the frame rate thereof exceeds an upper limit of the predetermined frames rate range, and images with the raised frame rate are played back, and wherein, when the capacity of a processing circuit for processing the 3D images becomes insufficient as a result of the raised frame rate of the left-eye parallax images and the right-eye parallax images, the frame rate of the left-eye parallax images and the right-eye parallax images are raised, and simultaneously the size of the left-eye images and the size of the right-eye images are reduced and displayed alternately in time division until the capacity of the processing circuit reaches a sufficient level so as to present images having depth information.

2. A three-dimensional video playback method according to claim 1, wherein, when the frame rate of the 3D images is within the predetermined frame rate range at which a flicker is likely to occur, whether or not to raise the frame rate is presented to a user in a selectable manner, and when the user selects to raise the frame rate, the frame rate of the 3D images is raised.

3. A three-dimensional video playback apparatus comprising:

an video attribute determining unit configured to determine whether or not a frame rate of three-dimensional (3D) images is within a predetermined frame rate range at which a flicker is likely to occur, each of the images being a shutter-type 3D image displayed such that a left-eye parallax image and a right-eye parallax image are alternately displayed in time division;

a frame rate converter configured to raise the frame rate of the left-eye parallax images and the right-eye parallax images until the frame rate thereof exceeds an upper limit of the predetermined frame rate range, when the frame rate of the 3D images is within the predetermined frame rate range; and a resolution converter configured to raise the frame rate of the 3D images and configured to simultaneously reduce the size of the left-eye images and the size of the right-eye images and alternately display the left-eye images and the right-eye images in time division of reduced size until the capacity of the processing circuit reaches a sufficient level, to present images having depth information, when the capacity of a processing circuit for processing the 3D images becomes insufficient as a result of the frame rate raised by the frame rate.

4. A three-dimensional video playback apparatus according to claim 3, further comprising an output condition verification unit configured to acquire, from a display device that displays the 3D images, a signal including an instruction as to whether or not the frame rate is to be raised, when the frame rate is within the predetermined frame rate range at which a flicker is likely to occur, and wherein, when the instruction to raise the frame rate is acquired from the display device that displays the 3D images, the frame rate converter raises the frame rate of the 3D images.

* * * * *